No. 883,071. PATENTED MAR. 24, 1908.
B. ZIMMEL.
SHOVEL AND SCOOP.
APPLICATION FILED MAY 11, 1907.
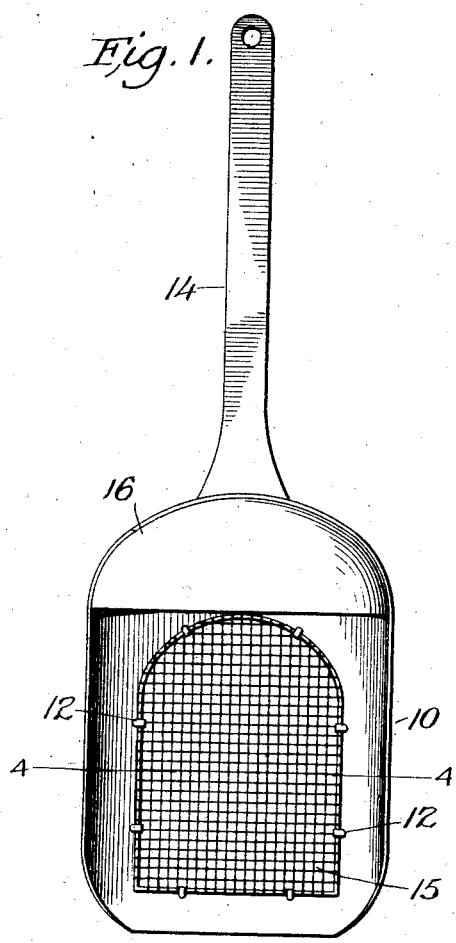
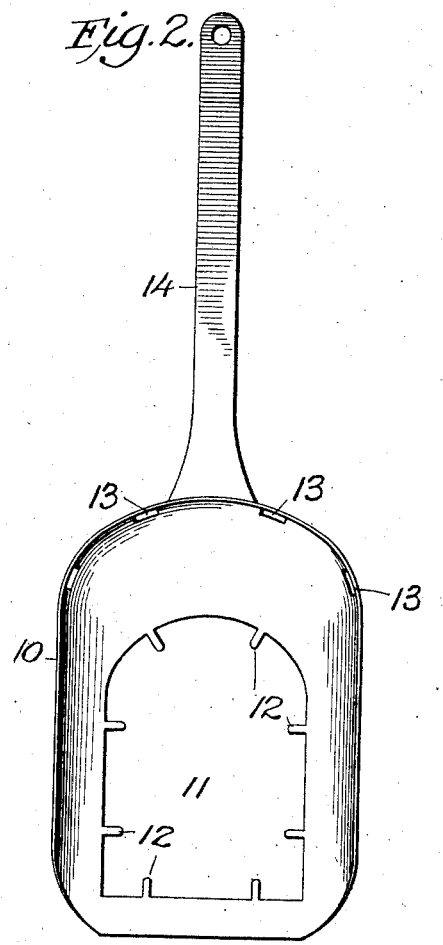
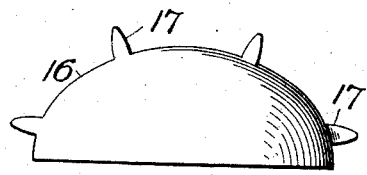
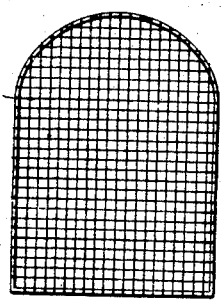
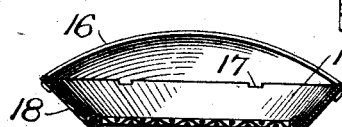
Bartholomew Zimmel, Inventor
Witnesses:
By his Attorney

UNITED STATES PATENT OFFICE.

BARTHOLOMEW ZIMMEL, OF NEW YORK, N. Y.

SHOVEL AND SCOOP.

No. 883,071.

Specification of Letters Patent.

Patented March 24, 1908.

Application filed May 11, 1907. Serial No. 373,125.

*To all whom it may concern:*

Be it known that I, BARTHOLOMEW ZIMMEL, citizen of the United States, residing at New York, in the county of New York and State of New York, have invented new and useful Improvements in Shovels and Scoops, of which the following is a specification.

This invention relates to shovels and scoops and more particularly to that class which at the same time may be used to sift and disintegrate certain substances for which the scoop may be used as may be more fully described in the following specification, set forth in the claims and illustrated in the drawings which accompany this application.

Figure 1 is a plan view of this improved shovel. Fig. 2 is a plan view of one part of the same. Fig. 3 is a plan view of one of the details. Fig. 4 is a sectional view of the shovel on the line 4—4 Fig. 1. Fig. 5 is a view of the sifting screen.

It is very often necessary in using shovels as scoops with certain granular substances that lumps and hardened accumulations of the material must be separated so that the material is again reduced to its granular state and in order to accomplish this particularly in the separation of sugar, salt and similar materials that this invention is designed. It is very often useful in the separation of cinders from ashes and in order to provide such an article the shovel is constructed as shown in the drawings preferably of one piece as shown in Fig. 2, where it is cut from a piece of metal and stamped with the depressed shovel section 10 having an opening 11. Around the edges of which are arranged the inwardly extending teeth or spurs 12. Along the rear edge of the shovel 10 are a series of slots 13 and extending rearward is the handle 14.

The opening 11 is adapted to receive a sifter 15 made of wire gauze or a piece of perforated metal made of the same size and adapted to be held in position by means of the spurs 12 which are passed through certain of the meshes of the sieve and are bent around the wire or frame which extends around and stiffens the edges thereof. The rear of the shovel is adapted to receive a hood 16 provided with spurs 17 which enter slots 13 in the upturned rear wall of the shovel in order to secure such hood to the shovel and form a pocket at the rear of the shovel to bank the substance which is being forced upon the same and confine it to the front of the shovel itself. After the salt, sugar or granular substance is received upon the shovel, by means of a lateral motion it is loosened so that it falls through the sieve in its granulated state.

It is obvious that various modifications may be resorted to without departing from the essential features above described.

The hood 16 not only acts as a retainer for the material in the scoop or shovel but also serves to brace the scoop or shovel and strengthen the same. Furthermore, the walls 18 which are turned at an angle to the bottom of the shovel serve to strengthen and reinforce the same and compensate for the loss of the material removed to form the opening 11.

What I claim as new and desire to secure by Letters Patent is:

In a shovel or scoop the combination with a shovel having its rear edge slotted and with an opening having spurs or prongs around its edge, of a sieve adapted to be secured by the spurs and a hood with prongs adapted to enter the slots and secure it to the shovel to form a pocket at the rear of the shovel and near the handle.

In testimony whereof, I affix my signature in presence of two witnesses.

BARTHOLOMEW ZIMMEL.

Witnesses:
JAMES F. DUHAMEL,
MAE W. CLINTON.